April 9, 1957 P. HULEY 2,787,882
GARDEN HAND RAKE
Filed June 21, 1954
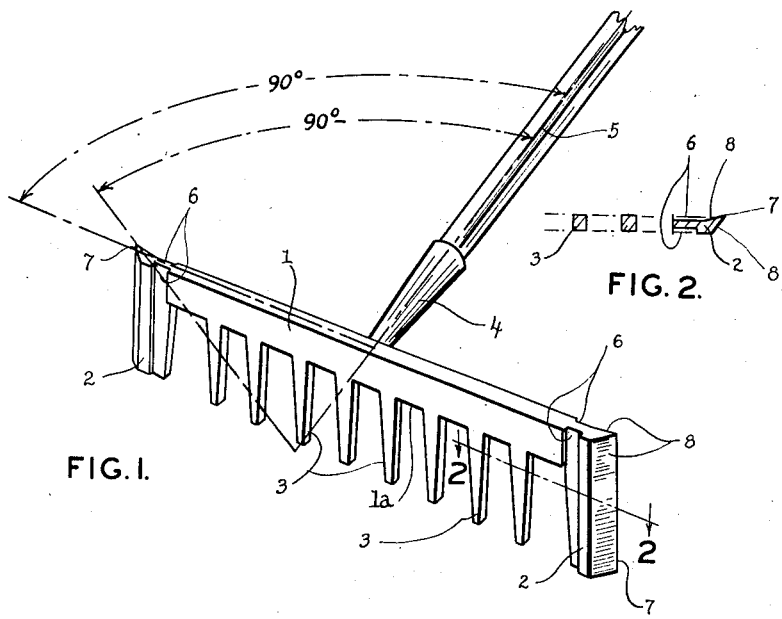
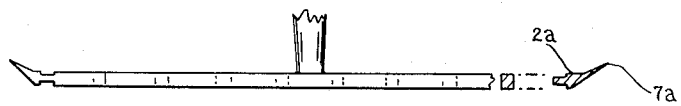
FIG.3.
FIG.4.
FIG.5.
Inventor
PETER HULEY
by W. Jimma Haskett
Attorney United States Patent Office 2,787,882
Patented Apr. 9, 1957

2,787,882
GARDEN HAND RAKE

Peter Huley, Dawson, Yukon Territory, Canada

Application June 21, 1954, Serial No. 438,233

1 Claim. (Cl. 56—400.05)

This invention relates to improvements in a garden hand rake and appertains particularly to one having sharpened cutting edges on the opposite ends thereof.

It is frequently found when raking a lawn or garden that roots, long grass, or weeds are encountered that should be cut off and removed. To adapt the rake to perform this additional hoe-like operation, the opposite ends of the crosshead are sharpened, but in view of the length of the crosshead of the usual rake, the downward chopping stroke of the sharpened hoe end is too nearly vertical to provide the best cutting action.

Consequently, it is an object of the present invention to provide an improved garden tool such as a relatively wide hand rake with sharpened, hoe-like ends that will operate better, more easily and with greater cutting efficiency by being disposed at an in-cutting angle of less than 90° to the tool handle.

A further object of the invention is to provide a garden hand rake with hoe-like cutting ends wherein the equilibrium of the tool, when used as a cutting hoe, is improved by lightening the longitudinally widened ends.

A still further object of the invention is the provision of a garden tool of the nature and for the purpose described that is characterized by structural simplicity, durability and low cost of production, whereby the same is rendered commercially desirable.

To the accomplishment of these and related objects as shall become apparent as the description proceeds, the invention resides in the construction, combination and arrangement of parts as shall be hereinafter more fully described, illustrated in the accompanying drawings and pointed out in the claim hereunto appended.

The invention will be best understood and can be more clearly described when reference is had to the drawings forming a part of this disclosure wherein like characters indicate like parts throughout the several views.

In the drawings:

Figure 1 is a perspective view of a simple form of the invention;

Figure 2 is a horizontal, longitudinal section as taken on line 2—2 of Figure 1;

Figure 3 is a top plan view of a modified form of rake crosshead, showing the opposite ends inclined at an angle toward the rake handle side;

Figure 4 is a similar top plan view of another modified form of rake crosshead, wherein the ends are curved toward the handle side; and Figure 5 is a top plan view of a further modified form of rake crosshead that is of arcuate form throughout its length.

My improved garden hand rake comprises a crosshead 1 with end teeth 2 and regularly spaced intermediate teeth 3 along its lower edge 1a. A handle socket 4 extends angularly upwards from near the top of one side of the crosshead at center and securely holds the end of a usual handle 5.

The intermediate teeth 3 have the customary taper on opposite longitudinal sides while the end teeth 2 are wider than the intermediate teeth, that is they extend longitudinally of the rake crosshead for a distance about equal to the space between two of the regular intermediate teeth, thus giving to such end teeth greater strength to resist bending when used for hoe-like chopping. To offset the increased weight of these wider end chopping teeth that tends to unbalance the tool when used as a hoe, they are thinned near their inside edges by vertically extending grooves 6 on opposite lateral faces. In this way they are lightened without being weakened and there is less tendency of the crosshead to toss to either side when being employed as a hoe-like cutting tool.

It is important that the cutting edge 7 on the extreme outer end of each end tooth 2 be disposed at an in-cutting angle to work easily and efficiently. Because of the length of the handle 5 and the distance of the cutting edge 7 from the junction of the handle socket 4 with the crosshead 1, the cutting edge strikes very nearly vertically when the tool is used as a hoe thus making the cutting action unnecessarily difficult. For this reason the outer end of each end tooth 2 is inclined inwards, toward the handle side of the crosshead, at an angle so that the cuttting end of the tooth, including the sharpening bevel 8 on each side of the cutting edge 7, lies at an angle of less than 90° to the handle.

In Figure 3, the end teeth 2a, for the greater part of width, longitudinally of the crosshead, are disposed at the desired inturned angle in the direction of the handle side of the crosshead and additionally, the cutting edges 7a are bevel sharpened on both sides to accentuate or increase such in-cutting angle.

In the modified forms of crossheads shown in Figures 4 and 5, the arcuate sweep of the opposite ends or whole length of the crossheads 1b and 1c respectively toward the handle side brings the cutting ends 7b and 7c into a similar in-cutting relationship whereby the operation of the rake, when used as a hoe-like cutting tool, is substantially improved.

From the foregoing description taken in connection with the accompanying drawings, it will be manifest that a garden hand rake is provided that will fulfill all the necessary requirements of such a device, but as many changes could be made in the above description and many apparently widely different embodiments of the invention may be constructed within the scope of the appended claim, without departing from the spirit or scope thereof, it is intended that all matters contained in the said accompanying specification and drawings shall be interpreted as illustrative and not in a limitative or restrictive sense.

Having thus described the invention, what I claim as new is:

A hand rake of the type having a crosshead and handle extending from an intermediate point thereof, said rake having teeth extending from said head in a plane substantially normal to that of said handle and having ends in a substantially common plane, an end tooth of said rake having lateral grooves extending substantially the entire length thereof and on opposite sides thereof, said tooth having an outer side in a plane extending at an acute angle to the plane of said teeth whereby to provide a longitudinal cutting edge.

References Cited in the file of this patent

UNITED STATES PATENTS

| 1,189,987 | Money | July 4, 1916 |
| 1,734,861 | Knott | Nov. 5, 1929 |
| 2,726,504 | Paluska | Dec. 13, 1955 |

FOREIGN PATENTS

| 123,056 | Sweden | Aug. 19, 1948 |